(12) United States Patent
Aaltonen

(10) Patent No.: US 6,400,325 B2
(45) Date of Patent: Jun. 4, 2002

(54) ARRANGEMENT FOR REDUCING THE EFFECT OF DOPPLER SHIFT ON RADIO RECEPTION

(75) Inventor: Janne Aaltonen, Turku (FI)

(73) Assignee: Nokia Multimedia Terminals Oy, Turku (FI)

(*) Notice: Subject to any disclaimer, the term of this patent is extended or adjusted under 35 U.S.C. 154(b) by 0 days.

(21) Appl. No.: 09/737,282

(22) Filed: Dec. 14, 2000

(30) Foreign Application Priority Data

Dec. 17, 1999 (FI) .............................. 19992717

(51) Int. Cl.[7] ................................. H01Q 1/28
(52) U.S. Cl. ........................ 343/711; 340/444
(58) Field of Search ................. 343/711, 712, 343/713, 714; 342/5, 6, 14, 15; 346/444

(56) References Cited

U.S. PATENT DOCUMENTS 5,673,049 A  9/1997  Kitchen .................. 342/6
6,204,758 B1 * 3/2001 Wacker et al. ........... 340/444

FOREIGN PATENT DOCUMENTS

| EP | 0146858 | 7/1986 |
|----|---------|--------|
| WO | 9403938 | 2/1994 |

* cited by examiner

*Primary Examiner*—Tan Ho
*Assistant Examiner*—James Clinger
(74) *Attorney, Agent, or Firm*—Ware, Fressola, Van Der Sluys & Adolphson LLP

(57) ABSTRACT

An antenna arrangement is provided for use in a vehicle. It comprised an antenna element (601–606, 701a–704f, 901–907, 1203) and means (600, 801, 802, 803, 804, 900, 910, 1200, 1201, 1202) for moving the antenna element in relation to the vehicle. The means for moving the antenna element are arranged to move the antenna element in relation to the vehicle into a direction which is opposite to a direction of movement of the vehicle.

11 Claims, 6 Drawing Sheets

ARRANGEMENT FOR REDUCING THE EFFECT OF DOPPLER SHIFT ON RADIO RECEPTION

TECHNOLOGICAL FIELD

The invention concerns generally the technology of transmitting and receiving radio signals in a situation where the transmitting and receiving stations are in motion relative to each other. Especially the invention concerns the methods and arrangements which are employed to reduce the adverse effects of doppler shift.

BACKGROUND OF THE INVENTION

If the transmitting and receiving antennas through which a radio connection is conducted are moving in relation to each other, the receiver sees a doppler shift in all frequency components of the transmission. As an example we may consider a radio connection between a fixed base station and a mobile station located within a moving vehicle, e.g. a car. The largest doppler shifts are encountered when the car is moving at a high speed along a straight road either directly towards the base station or directly away from it. Complicated doppler effects arise from multipath propagation, since there may be two or more competing propagation paths which give rise to differently valued positive doppler shifts and still others which experience various negative doppler shifts. The doppler shift is constantly changing as the relative movement between the transmitter and receiver changes. The adverse effects caused by doppler shift include signal distortion and difficulties in following the transmission on a certain frequency channel. Doppler shift may cause major problems in wireless transmission if there are several frequency channels close to each other, if the attempted data rate over the connection is very high and/or if there is used a modulation method which is prone to errors caused by frequency distortion.

Conventional ways of fighting the adverse effects of doppler shift may be broadly categorized to either changing the tuning of the transmitter or the receiver in order to cancel the frequency changes caused by the doppler shift, or to processing the received signal in order to reconstruct the transmitted signal despite of the distortions. The first approach requires that either there exists some knowledge about the relative motion of the transmitter and the receiver so that the amount of doppler shift can be calculated and the tuning of the receiver (or transmitter) can be changed, or the receiver is able to scan through a frequency band around the nominal reception frequency in order to find the doppler shifted transmission. This approach is not suited for the reception of multiple differently shifted signal components. The latter approach is usually based on the correlational characteristics of digital signals so that a wideband receiver (or a number of parallel narrowband receivers) is used to receive the whole frequency band which includes the most important multipath components, and a digital signal processor works hard to collect the signal energy related to the desired signal and to suppress noise and spurious transmissions.

The above-mentioned conventional methods require carefully designed and complex doppler compensation circuitry in the receiver, which increases the manufacturing costs. Even then the constantly changing arbitrary nature of doppler effects makes it very difficult to set up and maintain high data rate connections e.g. to and from a moving car. As an example we may consider the mobile reception of the known DVB-T (Digital Video Broadcasting—Terrestrial) signals. There have been defined two transmission standards within DVB-T, known as the 2 k and 8 k standards. Both are based on OFDM or Orthogonal Frequency Division Multiplexing, where the bits of a digital transmission signal are distributed onto a number of parallel orthogonal carriers. The 2 k standard involves 2048 orthogonal carriers with the mutual spacing of 4464 Hz and the 8 k standard involves 8192 carriers at a spacing of 1116 Hz. Simulation and practical experiments have shown that at the priority date of this patent application mobile reception of an 8 k signal is only possible when the vehicle speed remains under 80 km/h. The greater spacing between carriers in the 2 k system makes it easier to track and receive correctly even on a moving platform, so mobile reception of a 2 k signal should be possible at speeds up to 300 km/h.

SUMMARY OF THE INVENTION

It is an object of the invention to provide an arrangement for reducing the adverse effects of doppler shift in mobile radio communications.

The objects of the invention are achieved by moving an antenna in relation to a moving vehicle so that the relative movement therebetween decreases the relative movement between the antenna and another communicating radio station.

The arrangement according to the invention is suitable for use in a vehicle and comprises an antenna element and means for moving the antenna element in relation to the vehicle. It is characterized in that the means for moving the antenna element are arranged to move the antenna element in relation to the vehicle into a direction which is opposite to a direction of movement of the vehicle.

Above we have noted that although it is typical to name the relative movement of a transmitter and a receiver as the cause of doppler effects, the actual cause is the relative movement between the transmitting and receiving antennas, which is not the same thing. Conventional vehicular antennas are fixed to the vehicle chassis, which causes them to move exactly at the same speed as the vehicle itself. According to the invention there is provided a movable mounting arrangement for a vehicular antenna. When the momentary velocity vector of the vehicle in relation to another radio station is at least approximately known, the movable antenna arrangement is used to generate a corresponding momentary velocity vector between the vehicle and the antenna so that the directions of the two vectors are essentially opposite. Most advantageously also the absolute values of the two vectors are as close to equal as possible.

The general idea of moving an antenna in relation to a moving vehicle can be practically implemented in a multitude of ways. A first embodiment of the invention is applicable to vehicles running on wheels. All parts of the wheels except the very center of each wheel are in a constant movement in relation to the vehicle body. In the coordinate system of the road or track along which the vehicle is moving the parts of the wheels exhibit a certain periodic motion where their velocity vector comes even close to zero at certain times. Several antenna elements may be placed within the wheel and coupled to a switch which repeatedly reselects that antenna element to be coupled to a receiver which has the smallest velocity vector in the coordinate system of the road.

Another embodiment of the invention involves a rotational arrangement of antenna elements placed somewhere else in the vehicle than wheels. There may be even a completely independent rotational antenna consisting of separately selectable antenna elements and freely placed into the most advantageous part of the vehicle. Various measurement methods may be used to determine the instantaneous velocity vector of the vehicle so that the selection of active antenna element(s) is always made optimally to compensate for the instantaneous vehicular velocity.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
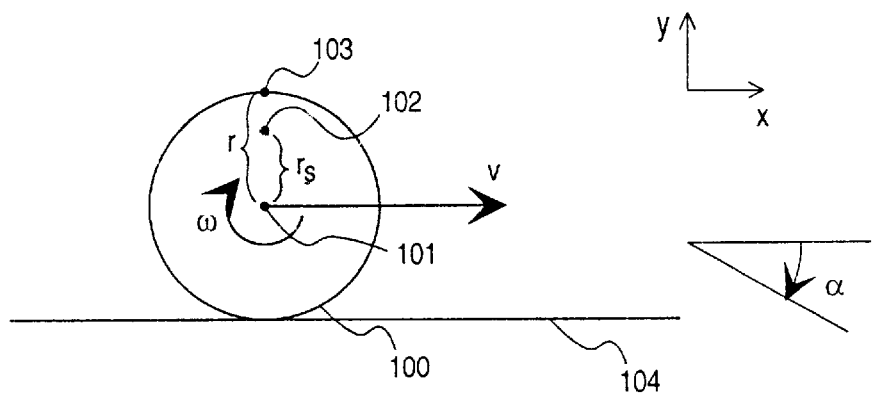
FIG. 1 illustrates the location of certain observation points in a moving wheel.

FIG. 1 shows a circular wheel 100 where a first observation point 101 is located exactly at the wheel hub, a second observation point 102 is located at a distance $r_s$ from the hub and a third observation point 103 is located at the rim of the wheel so that the distance between it and the center point 101 is r, i.e. the same as the radius of the wheel. The second and third observation points 102 and 103 are placed along a single imaginary radial line. The wheel 100 is moving to the right in the horizontal direction at a speed v as well as rotating clockwise at an angular speed $\omega$. Here we treat the horizontal and angular speeds as scalar quantities. As a first assumption the translational and rotational movements of the wheel are not linked to each other.

If we analyze the horizontal and vertical speed components $v_x$ and $v_y$ of the observation points 101, 102 and 103 first without taking into account the overall horizontal speed of the wheel 100, we note that these are easily calculated from the formulas $$v_x = -\omega r_i \sin\alpha \quad (1)$$

$$v_y = -\omega r_i \cos\alpha$$

where $r_i$ is zero for point 101, $r_s$ for point 102 and r for point 103. The angle $\alpha$ is defined to increase clockwise from the direction of the horizontal speed v. If we now take into account also the horizontal speed v, we note that $v_y$ stays the same but $v_x$ changes to $$v_x = v - \omega r_i \sin\alpha \quad (2)$$

An interesting special case is the one where the translational and rotational movements of the wheel are linked through the fact that the wheel 100 rolls on a horizontal surface 104 without sliding. In this case $v = \omega r$ and the formula for the horizontal speed $v_x$ becomes $$v_x = v\left(1 - \frac{r_i}{r}\sin\alpha\right) \quad (3)$$

Figure 2:
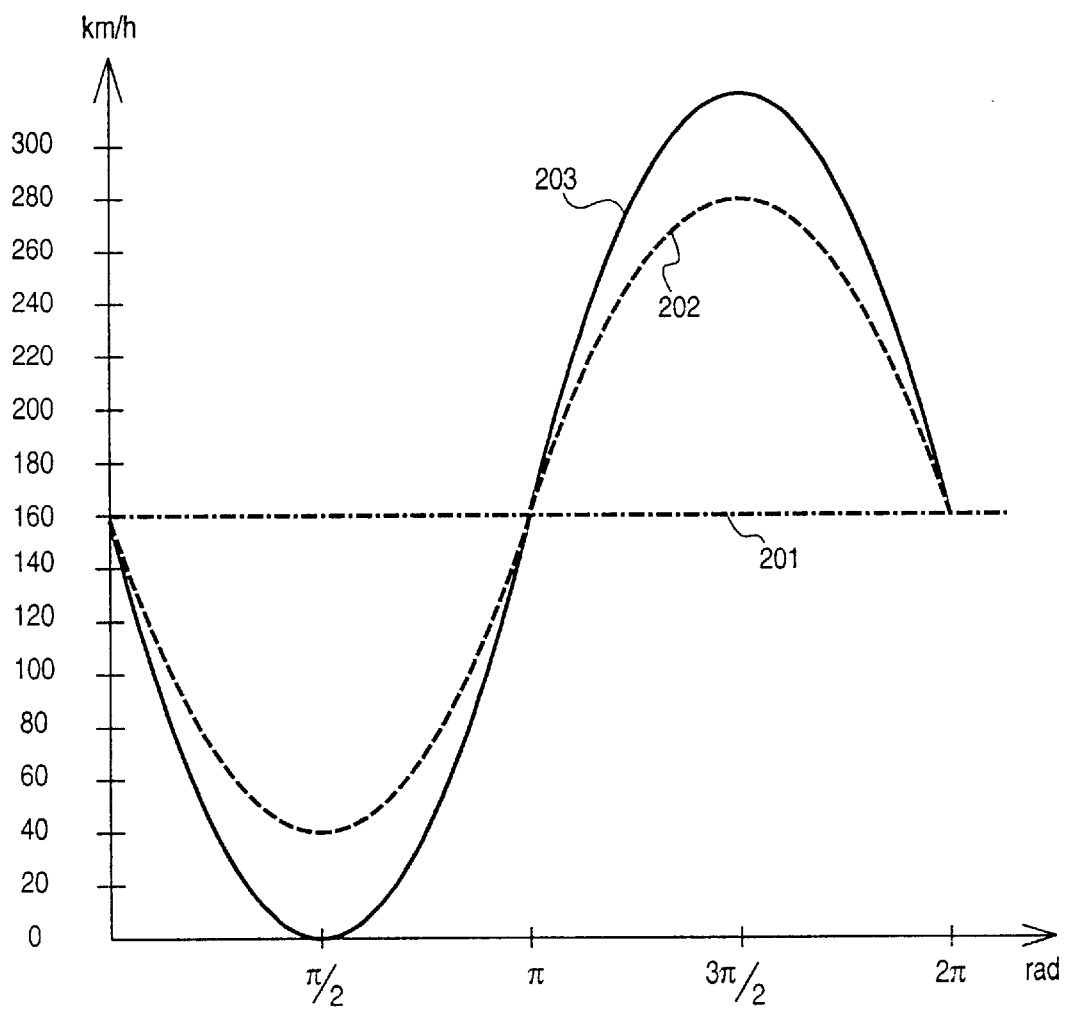
FIG. 2 illustrates the combined horizontal speeds of the points shown in FIG. 1.

The special case referred to above is the one where the wheel 100 is a part of a vehicle like a car or a train which runs on a road or a track. Let us assume that the speed of the car is 160 km/h and the ratio $r_s/r$ is equal to 3/4. FIG. 2 shows a plot of the momentary horizontal speeds of the observation points 101, 102, and 103 as functions of the angle $\alpha$ with curves 201, 202 and 203 respectively. The curve 201 is a straight line at 160 km/h which is natural since for point 101 the formula (3) reduces to $v_x = v$. The curves 202 and 203 exhibit sinusoidal oscillations around the mean value of 160 km/h.

Figure 3:
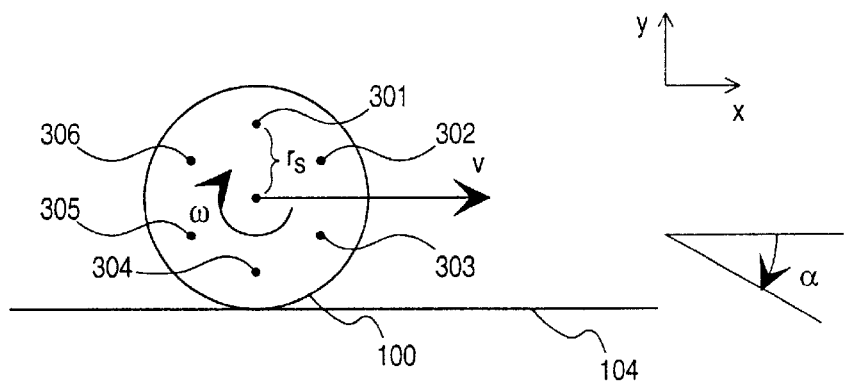
FIG. 3 illustrates the movement of six observation points on a wheel.
Figure 4:
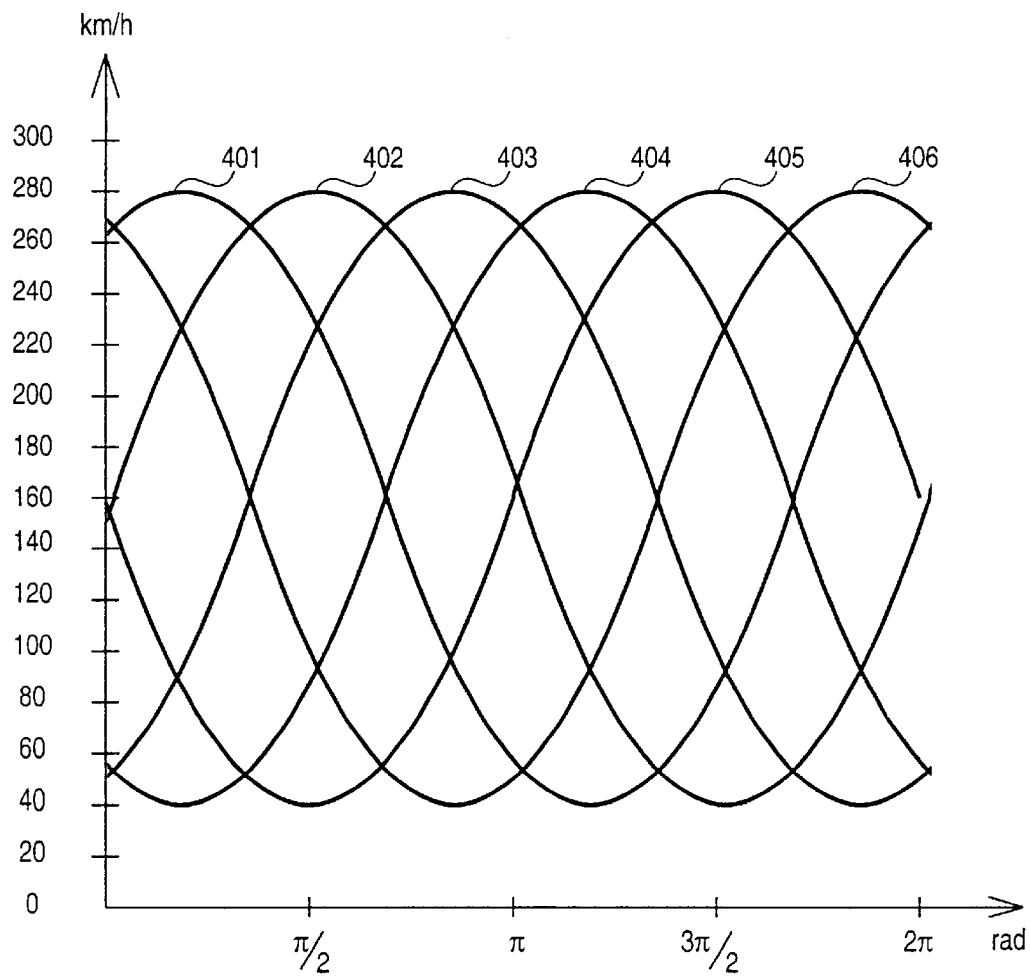
FIG. 4 illustrates the combined horizontal speeds of the points shown in FIG. 3.

Let us now place six observation points 301 to 306 into the wheel 100 so that point 301 is the same as point 102 in FIG. 1 an the other points are at the same radial distance $r_s = (3/4)r$ from the center point but at equal angular intervals of $\pi/3$ radians as illustrated in FIG. 3. FIG. 4 shows the plots of the momentary horizontal speeds of the points 301 to 306 as functions of the angle $\alpha$ with curves 401 to 406 respectively. The assumption $v = \omega r$ remains valid. It is easy to show that there is all the time at least one point the momentary horizontal velocity of which is smaller than 60 km/h.

In general we may state that the translational speed of the wheel is v, its angular speed is $\omega$ (with no specific relationship to the translational speed), there are N observation points placed at a radial distance $r_s$ from the center point and at equal angular separations $\beta$ (so that $\beta = 2\pi/N$), and the rotation angle of a certain observation point in relation to the direction of the translational speed v is $\omega t$ (where t means time). The range of rotational angles within which the horizontal speed of a certain observation point is smaller than the horizontal speed of all other observation points is the range when $\omega t$ is larger than $(\pi - \beta)/2$ but smaller than $(\pi + \beta)/2$. If there is a limiting speed $v_{limit}$ so that at all times there must be at least one observation point the horizontal speed of which is smaller than $v_{limit}$, we may write the formula $$v - \omega r_s \sin\left(\frac{\pi - 2\pi/N}{2}\right) < v_{limit} \quad (4)$$

which is valid as long as $v \geq \omega r_s$. Formula (4) can be used for system design: if for example the parameters v, $\omega$, $r_s$ and $v_{limit}$ are fixed, a simple manipulation of formula (4) gives the minimum number N of equidistant observation points. Similarly if the parameters v, $\omega$, N and $v_{limit}$ are fixed, formula (4) gives the minimum distance $r_s$. Or if the parameters v, $\omega$, $r_s$ and N are fixed, formula (4) gives the achievable limiting speed $v_{limit}$.

Figure 5:
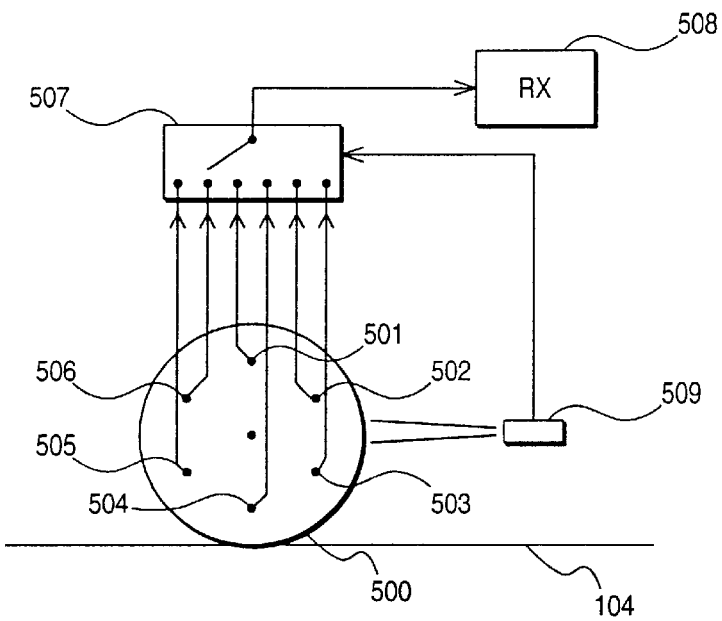
FIG. 5 illustrates a principle according to an embodiment of the invention.

FIG. 5 illustrates schematically an embodiment of the invention which is based on the above-given theoretical background. A wheel 500 is arranged to roll on an essentially horizontal surface 104. Six antennas 501 to 506 which are suitable for radio reception are mounted on the wheel at an equal radial distance from the center point of the wheel and at equal angular distances from each other. Each antenna is coupled to an RF switch 507 which is capable of selecting one antenna at a time for use. The RF switch 507 is further coupled to a radio receiver 508. A sensor 509 monitors the velocity and position of the wheel 500 and has a coupling to the RF switch 507 for giving control information.

The arrangement of FIG. 5 operates as follows. As the wheel 500 rolls on the surface 104, there is always one antenna the horizontal velocity of which is smaller than the horizontal velocity of all other antennas. The "minimum velocity" antenna is always the one for which the radial line between it and the center point is at an absolute angle smaller than $\pi/3$ to the straight line connecting the center point and the point of the wheel which is against the surface 104. The sensor 509 is arranged to inform the RF switch 507 about the position of the wheel 500 so that at each time the RF switch 507 couples the "minimum velocity" antenna to the radio receiver 508.

The theoretical background shows that even if the wheel 500 is one of the wheels of a car or a railway carriage travelling at 160 km/h directly towards a fixed base station or away from it, the radio receiver 508 receives a radio signal in which the maximum doppler shift corresponds to a translational speed of 60 km/h or less. It is clear from formula (4) that if the number of antennas or the radius at which they are installed in the wheel is increased, the car or railway carriage may travel even faster without increasing the momentary horizontal velocity of the antenna coupled to the radio receiver. Although only a receiving arrangement has been described above, the invention is equally applicable to a transmitter or transceiver arrangement since the operation of antennas is independent of signal direction and RF switches may easily be made to operate in both directions.

Figure 6:
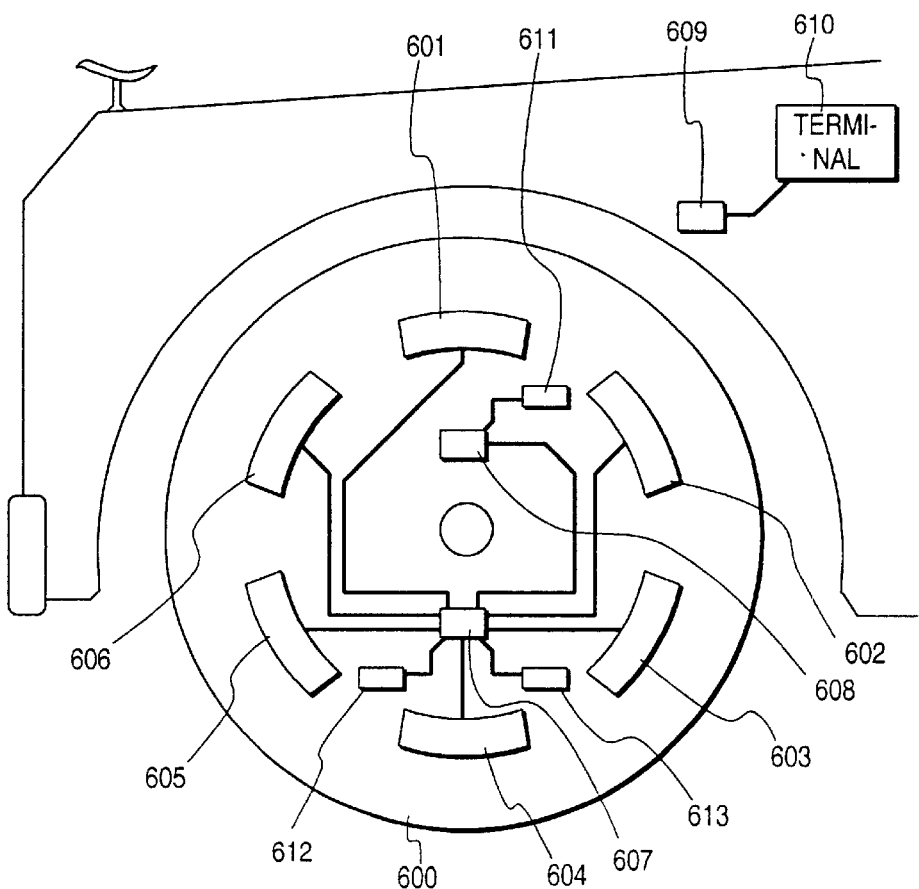
FIG. 6 illustrates an arrangement according to an embodiment of the invention.

There are a multitude of ways to practically implement the functionalities shown schematically in FIG. 5, especially regarding the placement of the components and the connections therebetween. FIG. 6 shows an exemplary wheel 600 on a vehicle. Six antennas 601 to 606 are mounted at a constant radial distance from the hub of the wheel and at equal angular displacements from each other. From each antenna there is a coaxial cable connection to an RF switch 607 which in turn has a coaxial cable connection to a first short distance wireless link transceiver 608. A second short distance wireless link transceiver 609 is mounted into the vehicle chassis so that a short distance wireless link may be established between the transceivers 608 and 609 (in a simpler embodiment there is a transmitter 608 in the wheel and a receiver 609 in the vehicle chassis so that the short distance wireless link is unidirectional). The second short distance wireless link transceiver 609 has a coaxial cable connection to a terminal arrangement 610 which is at least partly placed within the passenger cabin of the vehicle.

The RF switch 607 and the first short distance wireless link transceiver 608 need some electrical power for operating. In FIG. 6 there are two power generating units 611 and 612 fixed to the wheel 600 and having a cable connection to the short distance wireless link transceiver 608 and the RF switch respectively Each of the power generating units 611 and 612 houses a piezoelectric voltage generator and a small rechargeable battery (not separately shown in FIG. 6). When the wheel 600 rotates, the piezoelectric voltage generators convert some of the mechanical energy associated with the movement of the wheel into electrical energy, part of which is provided to the short distance wireless link transceiver 608 and the RF switch while the rest is stored into the rechargeable batteries. This arrangement does not place any limitations to the invention; there are several alternative ways of providing electric components mounted on a wheel with electrical energy. The second short distance wireless link transceiver 609 as well as the terminal arrangement 610 are most advantageously coupled to the main electrical system of the vehicle in order to get the required electrical energy.

The information about the position and movement of the wheel 600 which the RF switch 607 needs for selecting the correct antenna is provided by an odometer 613, where a small accelerometer and the associated integrators and other signal processing units (not separately shown in FIG. 6) monitor the state of movement of the wheel. Odometers of this kind are well known to the person skilled in the art, or equally well designed through the use of routine skills from the basis of existing knowledge of odometers.

The short distance wireless link between the transceivers 608 and 609 is most advantageously a radio link, although also other forms of wireless links can be used. In some cases it may even be possible to use a wired link through certain sliding contact means at the hub of the wheel.

Figure 7:
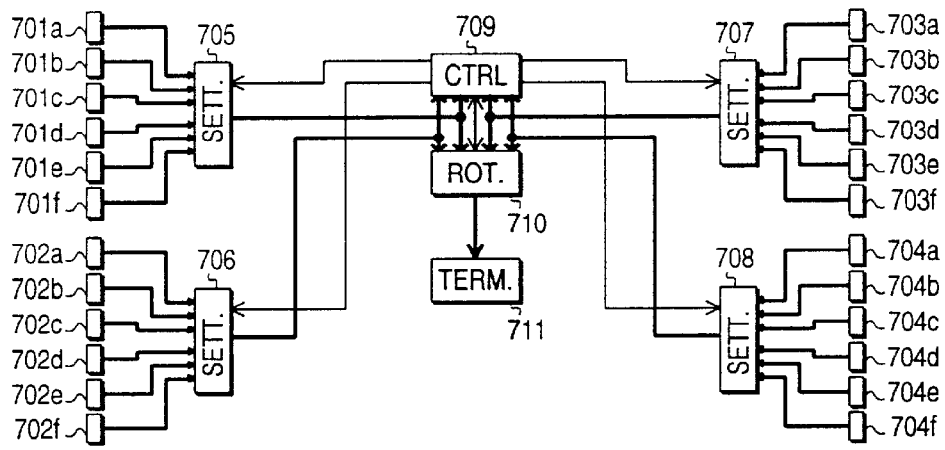
FIG. 7 illustrates an alternative principle according to an embodiment of the invention.

The wheel-mounted embodiments of the invention are not limited to the use of only one wheel of a vehicle. Most vehicles running on roads or tracks have at least four wheels, all of which may be equipped with antennas. FIG. 7 illustrates schematically an arrangement where there are six antennas 701a–701f in a first wheel, six antennas 702a–702f in a second wheel, six antennas 703a–703f in a third wheel and six antennas 704a–704f in a fourth wheel. Each group of six antennas is coupled to an RF switch, of which RF switches 705, 706, 707 and 708 are shown. These are further coupled to a control block 709 and a central RF switch 710, which is coupled to a terminal arrangement 711.

Figure 8:
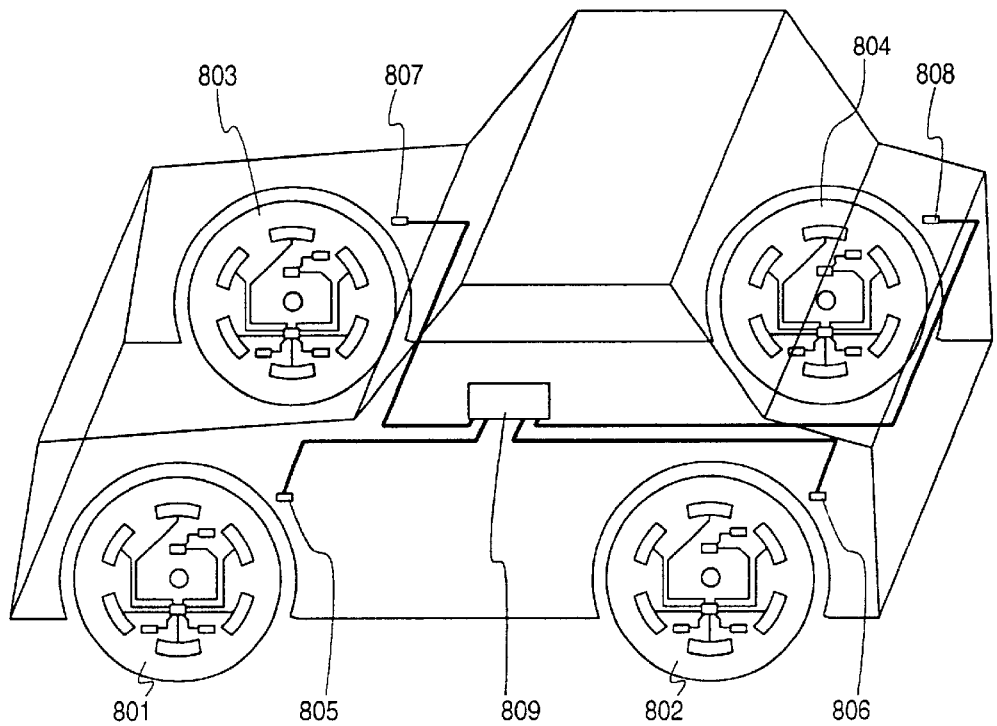
FIG. 8 illustrates another arrangement according to an embodiment of the invention.

The reason for using a separate central switch 710 and a control block 709 is that the switches 705, 706, 707 and 708 are settable and the central switch is "rotatable", i.e. repeatedly settable at a high rate. Initially each of the switches 705, 706, 707 and 708 only selects one antenna into use at each wheel. The control block 709 monitors the signals obtained through each wheel and commands, if necessary, some of the switches 705, 706, 707 and 708 to select another antenna until a certain target state has been reached. The target state is such where the central switch 710 can cyclically switch through the four parallel input signals coming from the switches 705, 706, 707 and 708 so that at all times the selected input signal contains the minimum obtainable doppler shift. FIG. 8 illustrates an implementation of the principle of FIG. 7 where each wheel 801, 802, 803 and 804 houses an arrangement corresponding to that described in FIG. 6, and the short distance wireless link transceivers 805, 806, 807 and 808 couple the wheels to a central processing unit which houses the functionalities of the blocks 709, 710 and 711 of FIG. 7.

Figure 9:
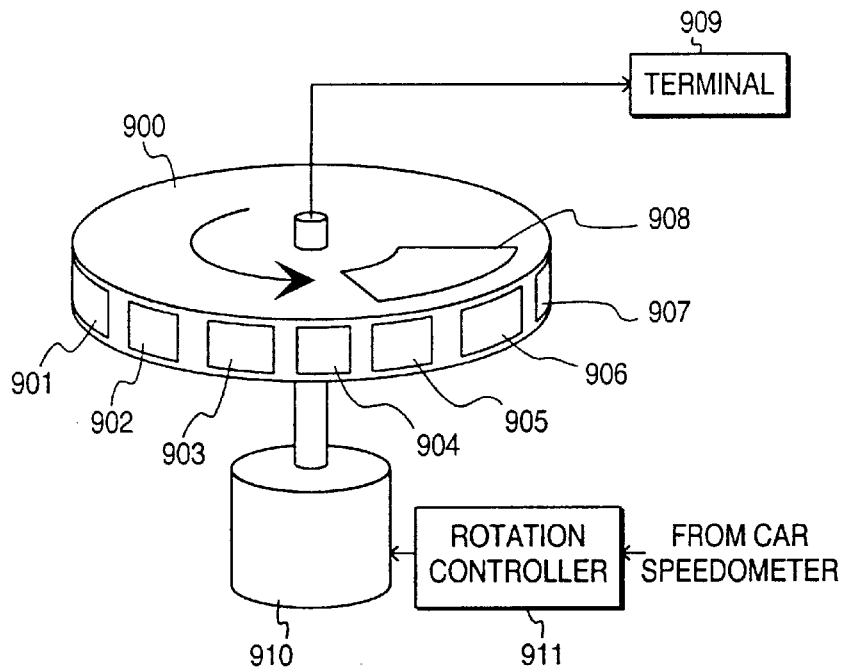
FIG. 9 illustrates another arrangement according to an embodiment of the invention.

In the foregoing we have mainly described such embodiments of the invention where the wheel that houses the antennas is among the wheels of a wheeled vehicle which also constitute the means on which the vehicle is moving. However, the invention encloses also such embodiments where the structure and movements of the antenna wheel can be selected more freely. FIG. 9 illustrates schematically an antenna wheel 900 with a multitude of mutually similar antennas attached to its outer rim; antennas 901 to 907 are shown. An RF switch 908 on the wheel selects always one of the antennas into use and couples it to a terminal arrangement 909 through a schematically shown coupling. A motor 910 is provided for rotating the antenna wheel 900 around its central axis. The rotating speed of the motor 910 is determined by a controller 911 which receives input information from the vehicle's speedometer.

The arrangement of FIG. 9 operates so that when the controller 911 knows the translational speed of the vehicle, it sets the rotating speed of the motor 910 so that at the intersection of the rim of the wheel 900 and a radial line perpendicular to the velocity vector of the vehicle the rim moves with an instantaneous speed which is equal in absolute magnitude but opposite in direction to the vehicle speed. The accuracy in setting the rotating speed of the motor is not critical, since errors of several tens of km/h are tolerable. The RF switch 908 selects into use always that antenna which is closest to said "zero velocity" point.

Figure 10:
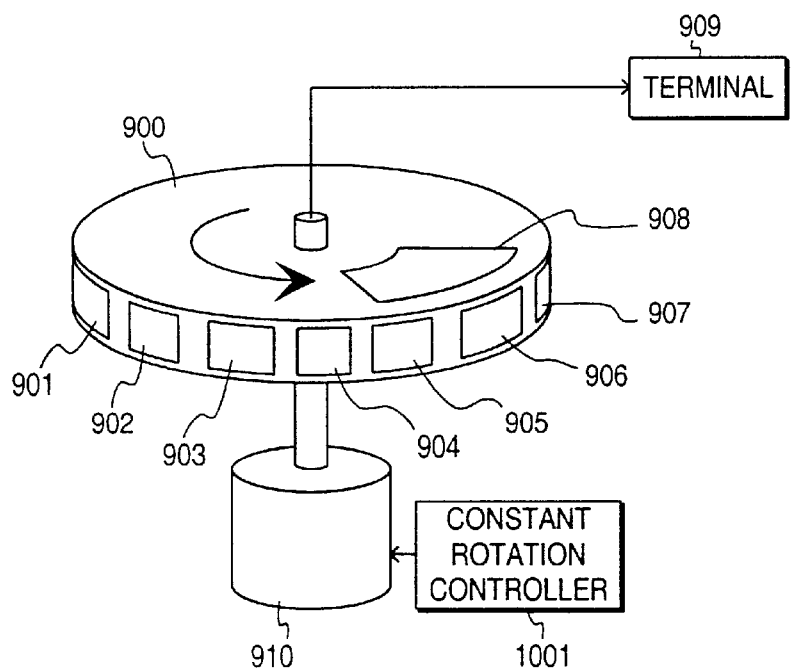
FIG. 10 illustrates a simplified version of the arrangement of FIG. 9.

FIG. 10 illustrates a simplified version of the arrangement in FIG. 9. Here the antenna wheel 900 is rotated at a constant angular speed determined by a constant rotation controller 1001 regardless of the speed of the vehicle. The constant angular speed is selected so that when the vehicle does not move at all, at the intersection of the rim of the wheel 900 and a radial line perpendicular to the longitudinal axis of the vehicle the rim moves with an instantaneous speed which is e.g. about 60 km/h backwards. In the description of prior art we have noted that vehicular speeds up to 80 km/h are allowed even for a DVB-T connection according to the 8 k standard, so the constant movement of 60 km/h backwards of the antenna selected into use in a vehicle standing still is tolerable. When the vehicle starts moving forwards, the speed in relation to ground of the antenna selected into use decreases and reaches zero as the vehicle speed reaches 60 km/h forwards. If the vehicle speed continues increasing, also the speed in relation to ground of the antenna selected into use increases. The vehicle may travel as fast as 140 km/h forwards with the speed in relation to ground of the antenna selected into use still remaining under the limit of 80 km/h.

A compromise between the embodiments of FIGS. 9 and 10 is such where the rotating speed of the motor 910 may be set to a selected constant value depending on the speed of the vehicle. At vehicle speeds under 140 km/h the rotating speed would be kept at a first constant value, and at higher vehicle speeds the rotating speed would be increased to a second, higher constant value.

Figure 11:
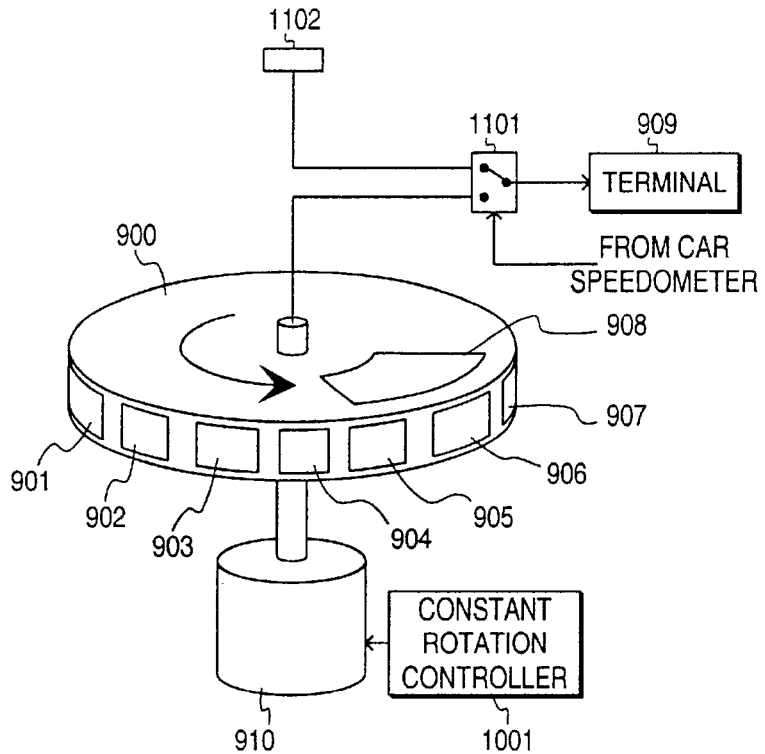
FIG. 11 illustrates a hybrid arrangement based on FIGS. 9 and 10 and FIG. 12 illustrates still another arrangement according to an embodiment of the invention.

FIG. 11 illustrates a hybrid antenna arrangement where the arrangement of FIG. 10 has been complemented with an additional RF switch 1101 and a fixed antenna 1102 which is mounted e.g. on the vehicle chassis. The RF switch 1101 receives input information from the vehicle's speedometer. The idea is to use the fixed antenna 1102 at all times when the vehicle speed is under a certain limit, like 60 km/h. The antenna wheel 900 is rotated at a constant angular speed determined by the constant rotation controller 1001 regardless of the speed of the vehicle. The constant angular speed is selected so that when the vehicle does not move at all, at the intersection of the rim of the wheel 900 and a radial line perpendicular to the longitudinal axis of the vehicle the rim moves with an instantaneous speed which is e.g. about 120 km/h backwards. When the vehicle speed exceeds 60 km/h, the RF switch 1101 selects the rotating antenna arrangement into use, which ensures low doppler shift at vehicle speeds up to 200 km/h with the above-given numerical values.

In the embodiments based on an independent antenna wheel like in FIGS. 9 to 11 the coupling between the moving body (the wheel) and the terminal is easier to implement than in those embodiments where the antennas are attached to the support wheels of a wheeled vehicle. Although the same short distance wireless link approach can be used also here, it is typically more advantageous to use a wired connection where sliding ring contacts, ring and brush contacts or other known arrangements are used to provide a galvanic coupling over rotational joints. Coupling a wired connection over a rotational joint is as such known to the person skilled in the art.

Figure 12:
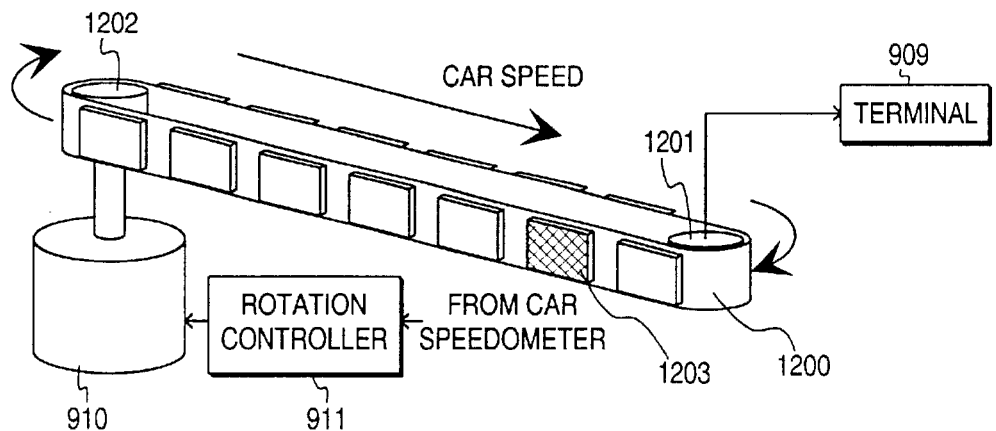

The mechanical body which is used to move the antenna(s) in relation to the vehicle does not need to be circular. All kinds of regular polygonal or even irregular shapes can be used, although support and rotation through a single axis suggests that regular shapes are the best. FIG. 12 discloses a radically different approach where a multitude of antenna modules are attached to a conveyor belt 1200 supported on at least two circular wheels 1201 and 1202. The support wheels are positioned so that there is an essential straight segment of the conveyor belt that extends parallel to the longitudinal axis of the vehicle in which the antenna arrangement is to be used. A motor 910 and a rotation controller 911 are used to move the conveyor belt so that along said essential straight segment of the conveyor belt the antenna modules attached thereto move into a direction essentially opposite to the velocity vector of the vehicle. A certain antenna module 1203 is shown as a selected antenna module; from the position shown in FIG. 12 the antenna module 1203 moves for a certain duration of time towards the support wheel 1202 so that in relation to ground it remains essentially stationary, if the rotating speed of the motor 910 has been set correctly.

The minimum number of antenna modules on the conveyor belt 1200 is three: if these are situated at equal distances (measured along the belt) from each other, there is always at least one antenna module moving linearly into a direction which is opposite to the velocity of the vehicle. For implementing the coupling between the selected antenna module and the terminal arrangement 909 each antenna module may have a short distance wireless link transceiver of its own, or one may use sliding contacts between the conveyor belt and the support wheels or a separate contact wheel or slider.

The switching moment when the receiving antenna is changed causes an instantaneous phase shift in the signal that reaches the receiver. Some compensating action may be required to remove the effect of the phase shift. The exact moment of the phase shift is known to the receiver and antenna control circuitry, which helps in correctly timing and dimensioning the compensating action.

The examplary embodiments described above should not be construed as having limiting effects on the applicability of the invention. Especially the various modifications to the basic idea presented as the invention may be combined into each other in various ways. For example the constant rotating speed and hybrid switching features of FIGS. 10 and 11 are also applicable to the embodiment of FIG. 12.

What is claimed is:

1. An antenna arrangement for use in a vehicle, comprising:
    a plurality of antenna elements;
    means for moving the antenna elements in relation to the vehicle; and switching means arranged to selectively switch one of said plurality of antenna elements into use at a time,
    wherein the means for moving the antenna elements are arranged to move the antenna elements in relation to the vehicle into a direction which is opposite to a direction of movement of the vehicle, and
    wherein the switching means are arranged to switch into use an antenna element for which the sum of velocity components caused by the velocity of the vehicle and the velocity of the antenna element in relation to the vehicle is closest to a predetermined value.

2. An antenna arrangement according to claim 1, wherein said means for moving the antenna element comprise a wheel which also acts as support and moving means of the vehicle.

3. An antenna arrangement according to claim 2, wherein said wheel comprises a radio frequency switch, means for determining an angular position of said wheel, and communication means for setting up and maintaining a communication connection between said wheel and other parts of the vehicle, so that said means for determining the angular position of said wheel are arranged to control the operation of said radio frequency switch in order to provide a coupling between one antenna element at a time and said communication means.

4. An antenna arrangement according to claim 3, wherein said communication means comprise a short distance wireless link transmitter.

5. An antenna arrangement according to claim 1, wherein said means for moving the antenna element comprise a rotationally mounted body and rotating means for rotating said rotationally mounted body.

6. An antenna arrangement according to claim 5, comprising control means for controlling the rotating speed of said rotating means, said control means being arranged to adjust said rotating speed according to the speed of the vehicle so that a certain point on said rotationally mounted body has an instantaneous absolute speed that is equal to the absolute speed of the vehicle and opposite in direction to the speed of the vehicle.

7. An antenna arrangement according to claim 5, comprising means for setting a constant rotating speed for said rotating means.

8. An antenna arrangement according to claim 5, comprising an antenna element which is stationary in relation to the vehicle, and switching means for selectively coupling either an antenna element on said rotationally mounted body or said stationary antenna element into use.

9. An antenna arrangement according to claim 8, wherein said switching means are arranged to respond to information describing the velocity of the vehicle.

10. An antenna arrangement according to claim 1, wherein said means for moving the antenna element comprise a movable belt loop with an essential straight segment, and moving means for moving said belt loop so that on said essential straight segment said belt loop moves into a direction which is opposite to the direction of movement of the vehicle.

11. An antenna arrangement for use in a vehicle, comprising:

a plurality of antenna elements;

means for moving the antenna elements in relation to the vehicle; and switching means arranged to selectively switch the plurality of antenna elements into use and out of use so that only one of said plurality of antenna elements is in use at a time, wherein the means for moving the antenna elements are arranged to move the antenna elements in relation to the vehicle, and wherein the switching means are arranged to switch into use an antenna element for which the velocity of the antenna element in relation to ground is closest to a predetermined value.

* * * * *